(12) United States Patent
Philipsen

(10) Patent No.: US 9,670,902 B2
(45) Date of Patent: Jun. 6, 2017

(54) BLADE FOR A WIND TURBINE HAVING A GUIDE VANE

(71) Applicant: SE Blades Technology B.V., Hengelo (Overijssel) (NL)

(72) Inventor: Iwan Philipsen, Zwolle (NL)

(73) Assignee: SE Blades Technology B.V., Hengelo (NL)

( * ) Notice: Subject to any disclaimer, the term of this patent is extended or adjusted under 35 U.S.C. 154(b) by 285 days.

(21) Appl. No.: 14/360,185

(22) PCT Filed: Nov. 26, 2012

(86) PCT No.: PCT/EP2012/073651
§ 371 (c)(1),
(2) Date: May 22, 2014

(87) PCT Pub. No.: WO2013/076313
PCT Pub. Date: May 30, 2013

(65) Prior Publication Data
US 2014/0286787 A1 Sep. 25, 2014

(30) Foreign Application Priority Data
Nov. 25, 2011 (NL) ..................................... 2007875

(51) Int. Cl.
*F03D 1/06* (2006.01)

(52) U.S. Cl.
CPC ......... *F03D 1/0633* (2013.01); *F03D 1/0675* (2013.01); *Y02E 10/721* (2013.01); *Y02E 10/726* (2013.01)

(58) Field of Classification Search
CPC ... Y02E 10/721; Y02E 10/726; F03D 1/0633; F03D 1/0675; F03D 1/065; F03D 1/0641; F03D 1/0683
(Continued)

(56) References Cited

U.S. PATENT DOCUMENTS 7,637,721 B2 12/2009 Driver et al.
8,303,250 B2 * 11/2012 Mohammed .......... F03D 7/0236
416/23

(Continued)

FOREIGN PATENT DOCUMENTS

DE 102008026474 A1 12/2009
EP 2107235 A1 10/2009
(Continued)

OTHER PUBLICATIONS

International Search Report for PCT Application No. PCT/EP2012/073651 dated Jul. 8, 2013.

*Primary Examiner* — Michael R Reid
(74) *Attorney, Agent, or Firm* — Norris McLaughlin & Marcus, P.A.

(57) ABSTRACT

One or more blades for a wind turbine have at least one guide vane (20) having a vane leading edge (22) and vane trailing edge (23), arranged in such that the guide vane (20) is substantially placed over a blade surface (8) of a suction side (16) of the blade (1) and extends in longitudinal direction (5) at least partly along the surface (8) of the root segment (12), wherein a line between the vane leading edge (22), the longitudinal axis (5) of the blade (1) and the chord (3) form at least one starting angle ($\beta$), and further wherein a second starting angle ($\beta_{II}$) in the transition portion (14) is greater than a first starting angle ($\beta_{I}$) in the plain portion (13) and less than a third starting angle ($\beta_{III}$) in the profiled portion (15).

11 Claims, 7 Drawing Sheets

Figure 1:
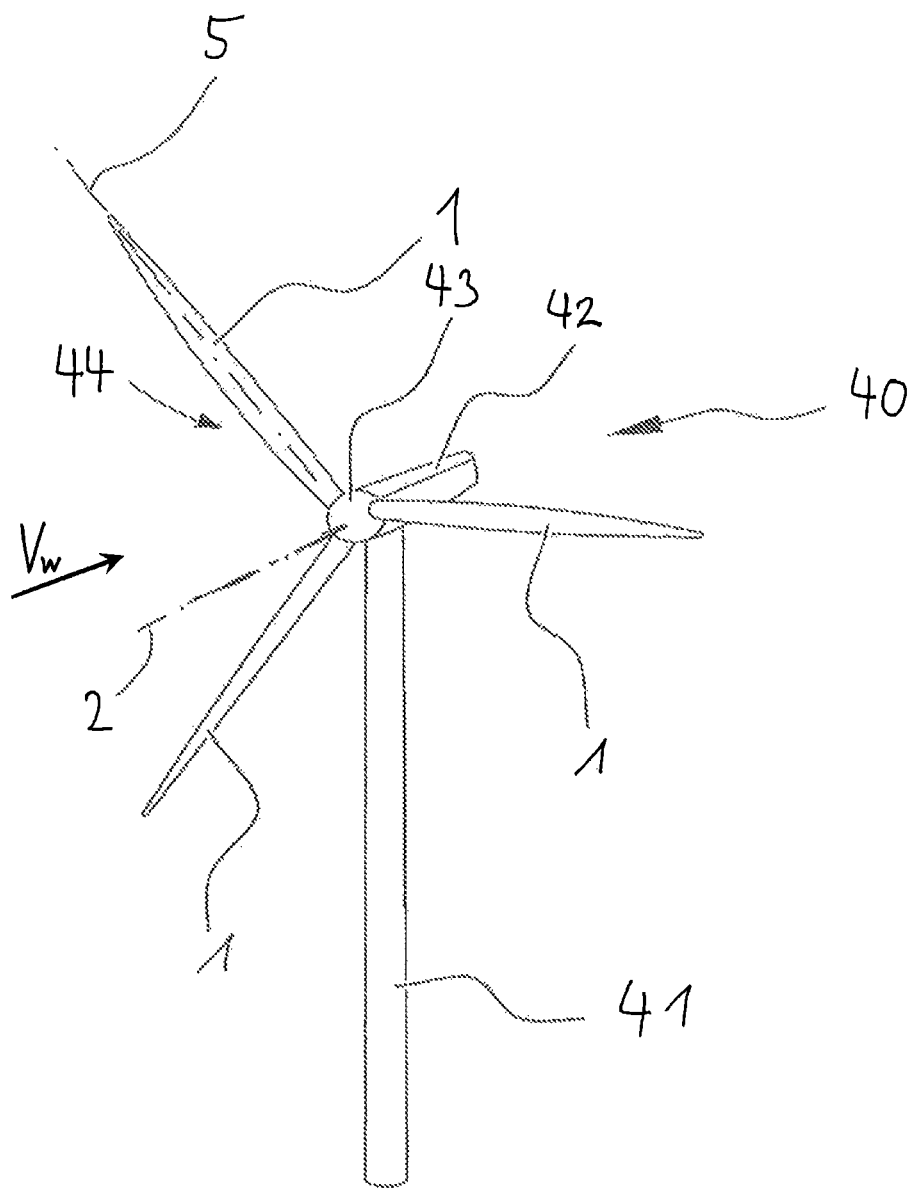

(58) Field of Classification Search
USPC ...... 416/62, 224, 229 R, 235, 236 R, 236 A, 416/237
See application file for complete search history.

(56) References Cited

U.S. PATENT DOCUMENTS

| | | | | |
|---|---|---|---|---|
| 8,777,580 | B2 * | 7/2014 | Eisenberg | ............. F03D 1/0633 |
| | | | | 416/239 |
| 8,834,130 | B2 * | 9/2014 | Fuglsang | ............. F03D 1/0675 |
| | | | | 416/203 |
| 2010/0158697 | A1 | 6/2010 | Kim | |

FOREIGN PATENT DOCUMENTS

| | | | |
|---|---|---|---|
| EP | 2141355 | A2 | 1/2010 |
| GB | 2462307 | A | 2/2010 |
| WO | 2009/121927 | A1 | 10/2009 |
| WO | 2010100237 | A2 | 9/2010 |
| WO | 2010133649 | A2 | 11/2010 |
| WO | 2011134985 | A1 | 11/2011 |

* cited by examiner

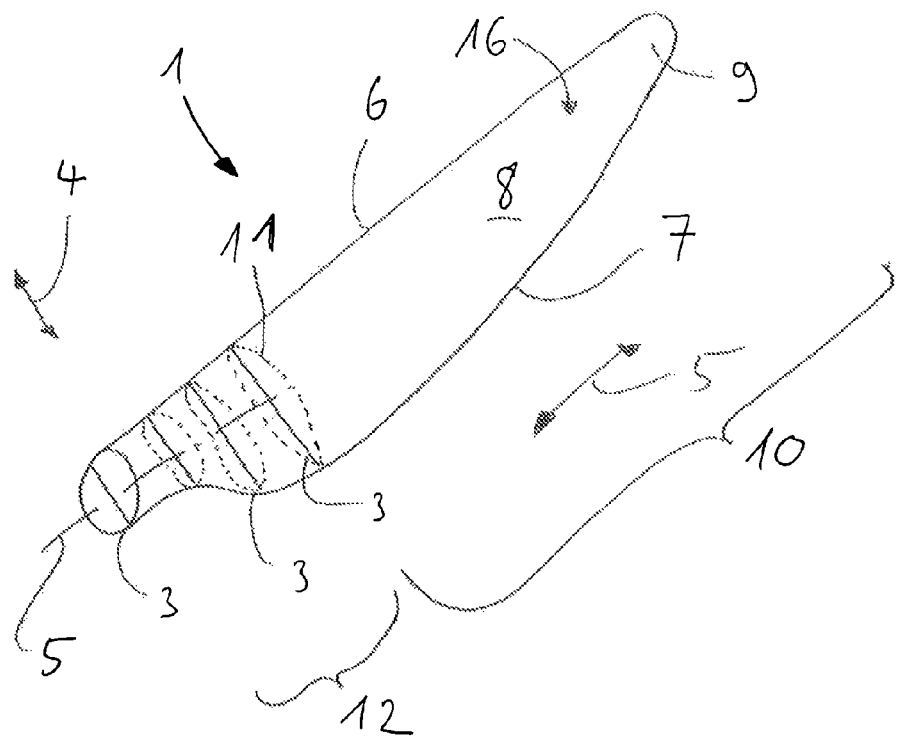
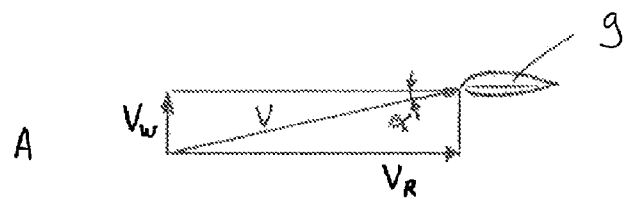
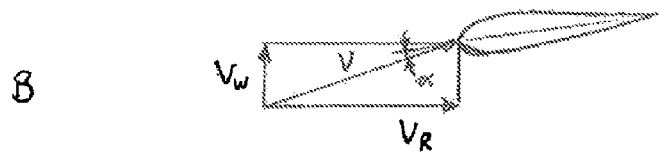
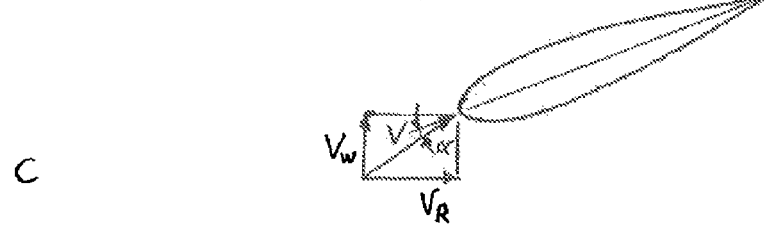

Fig. 5 (A-A)
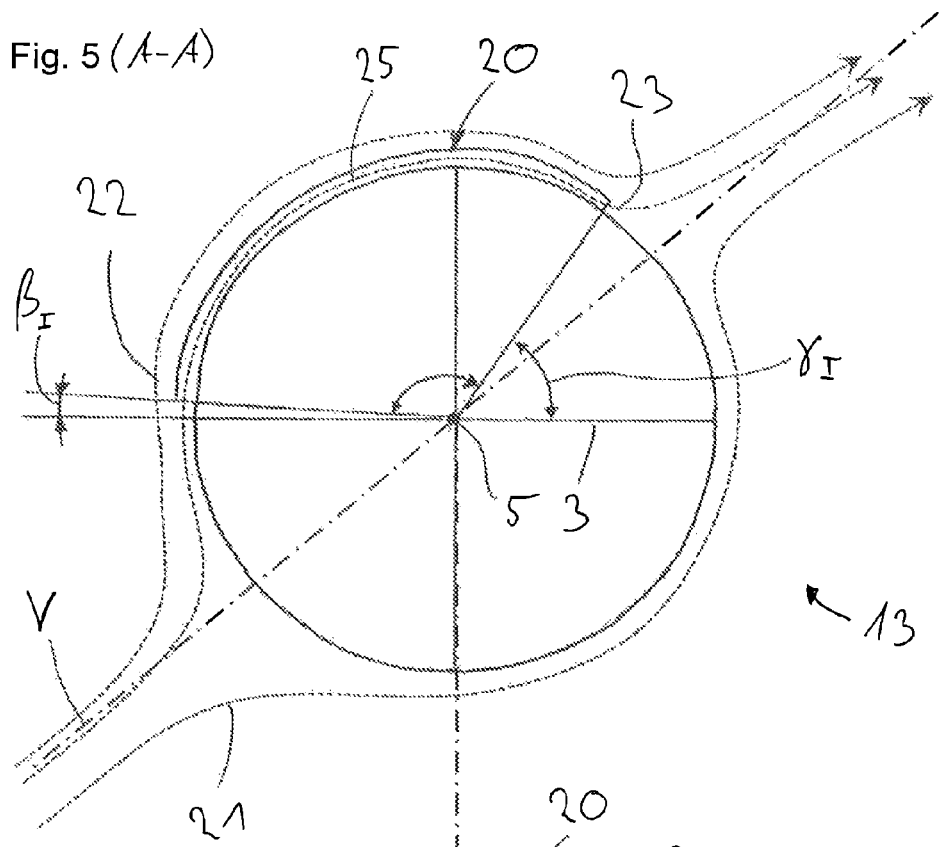
Fig. 6
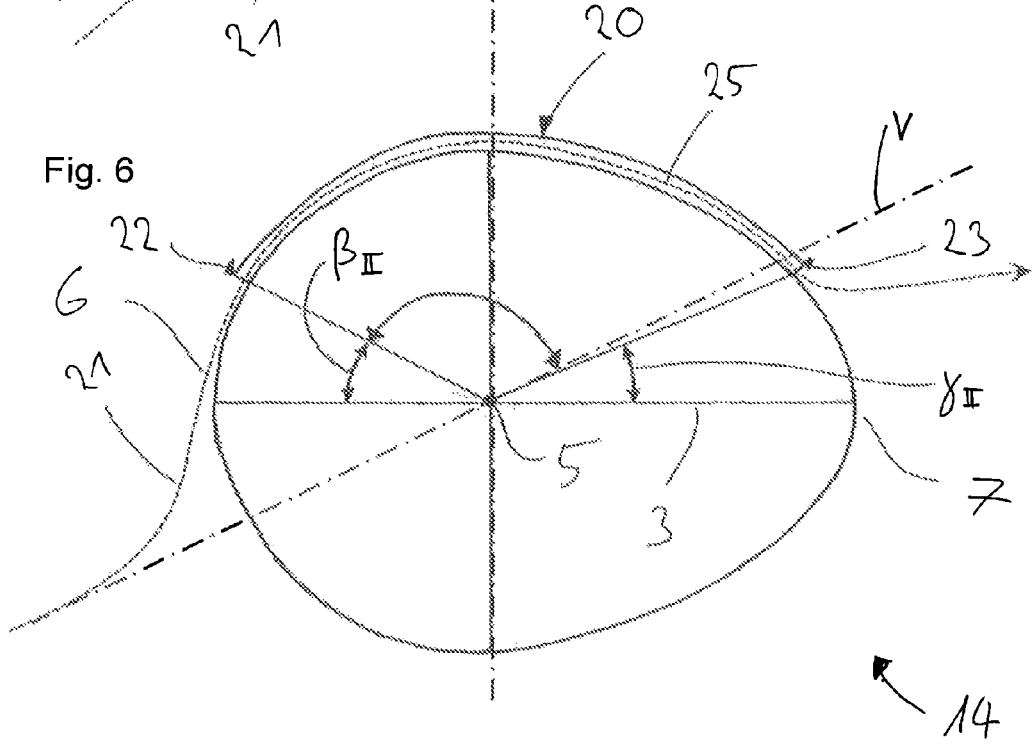

BLADE FOR A WIND TURBINE HAVING A GUIDE VANE

This application is a 371 application of PCT/EP2012/073651 filed 26 Nov. 2012, which claims foreign priority benefit under 35 U.S.C. §119 of Netherlands Application No. NL 2007875 filed 25 Nov. 2011.

The present invention relates to a blade for a wind turbine, comprising a root segment for connection to a hub and a profiled segment extending in a longitudinal direction from the root segment towards a tip of the blade. Such a blade is generally known. Flow conditions around a wind turbine blade vary significantly along the span of the blade. This is especially true for the local angle of attack, which is defined as the angle between the airflow at a given longitudinal location and a local chord of the blade at that location. In order to tailor the blade to these varying flow conditions, designers will normally vary the local angle of incidence, which is defined as the angle between the local chord and a plane in which the blade moves during its rotation. Since the effective flow velocity is the vector sum of the wind speed and the rotational speed of the blade, the local angle of attack of each segment of the blade would decrease with increasing distance to the axis of rotation, i.e. would decrease from the root outwards to the tip, if the angle of incidence would be kept constant along the span of the blade. Therefore, in order to prevent large variations in the effective angle of attack along the length of the blade a wind turbine blade is normally designed to have a significant amount of twist from root to tip. This twist is the result of the local angle of incidence being varied by design, so as to keep the local angle of attack within a desired range. In this way each part of the blade will provide a maximum amount of "lift" with a minimum amount of drag. However, a highly twisted root segment could lead to problems with blade-tower clearance, since the innermost part of the blade would then theoretically be virtually parallel to the axis of rotation of the blade. Moreover, this would lead to problems in manufacturing due to the large amount of curvature of the load carrying components.

In actual practice the root segment of a blade will often have an entirely circular cross section. This is because the root is a highly loaded segment of the blade where structural design considerations take precedence over aerodynamics. A typical wind turbine blade will be subjected to bending loads, torsional loads and centrifugal loads, all of which must be transmitted to the hub and supporting structure through the root segment, where these loads also reach their peak values. The root segment of a wind turbine blade will therefore normally not generate any lift or contribute to the power generation of the wind turbine. Actually, the root segment will only contribute to the overall drag of the wind turbine blade.

Even though the energy contained in the wind itself is free, wind turbines represent an increasingly higher investment, so that their efficiency is a major concern. The root segment generating only drag and no lift is an impediment when trying to increase overall aerodynamic efficiency of a wind turbine blade.

It is one object of the invention to provide a new and improved wind turbine blade which avoids the mentioned disadvantages, i.e. to provide a blade having a root segment contributing to the generation of lift.

In accordance with the invention this is achieved by a wind turbine blade having the elements of claim 1. Such blade with a longitudinal axis comprises a root segment with a flange for connecting the blade to a hub of a rotor of the wind turbine and a profiled segment extending in longitudinal direction from the root segment towards a tip of the blade. This profiled segment is defined as an area of the blade having a cross section with a qualified optimal aerodynamic profile which generates maximum lift and is commonly known to the person skilled in the art.

Further the profiled segment has a lift-producing profile and a chord being perpendicular to the longitudinal axis and substantially extends from a leading edge to a trailing edge of the profile. This chord varies regarding its length over the longitudinal length of the blade depending on the size of the profile but always remains perpendicular to the longitudinal axis. The longitudinal axis is defined as an imaginary line within the blade extending from the root of the blade to the tip and intersecting with the chord where the blade has the largest thickness or height. The thickness or height of the blade is measured perpendicularly to the chord.

The root segment shows a profiled portion adjoining the profiled segment, a plain portion adjoining a flange and a transition portion being located between the profiled portion and the plain portion. The profiled portion is having a substantially profiled cross-section hence it generates lift—not as efficient as the qualified profile in the profiled section. The plain portion shows a substantially rounded cross-section.

Per definition all portions of the root segment having chords being parallel to each other. Further those chords of all portions are arranged substantially parallel to a chord of the profiled segment which adjoins the profiled portion of the root segment. This definition supports the later description of the invention but shall not limit it. If an embodiment of a blade comprises a chord alternatively defined in the root segment which is not parallel to a chord in the profiled segment then a chord pursuant to the definition of this very invention shall be added to that embodiment of a blade in order to understand the extent of protection of this protective right.

When applying the remaining elements of claim 1 to those elements mentioned the initial problem is solved by having a blade root segment—or a neighboring segment—which produces lift and thus adding torque to the rotor of the wind turbine and subsequently increasing the yield. For this the blade comprises at least one guide vane with a vane leading edge and vane trailing edge on the suction side. One could say that the vane leading edge is oriented towards the leading edge of the blade and the vane trailing edge looks in the direction of the trailing edge of the blade. This guide vane is arranged in such that the guide vane is substantially placed over the blade surface and extending in longitudinal direction at least partly along the surface of the root segment. In other words the vane guide covers partially the surface of the blade and forms a channel between the surface of the blade and the guide vane.

The guide vane forces the air to follow the contour of the root segment, thus preventing premature flow separation and the resulting additional drag. Since the problem of a mismatch between the aerodynamic optimum and the structural optimum is greatest in the vicinity of the hub, the guide vane can be most effective in the root segment, i.e. in the plain portion of it.

For describing the invention a starting angle $\beta$ defines the location of a "starting point" of the guide vanes or the vane leading edge on the blade. The chord and the longitudinal axis of the blade serve as coordinate system. The starting angle $\beta$ is defined between the chord and a line from the vane leading edge to the longitudinal axis of the blade.

According to one solution the guide vane is embodied in such that the location of the leading edge and/or the trailing edge of the guide vane vary in longitudinal direction. By this variations in a local angle of incidence may be accommodated. Therefor a starting angle $\beta_{III}$ in the profiled portion is larger than a starting angle $\beta_I$ in the plain portion. For obtaining best results the guide vane is located over a downstream area of the blade. Due to the fact that the area of a "downstream" of the wind depends on the angle of attack of the wind towards the blade it is insured that the guide vane is located exactly where needed by choosing the varying location of the guide vane Additionally a starting angle $\beta_{II}$ in the transition portion is larger than a starting angle $\beta_I$ in the plain portion and smaller than a starting angle $\beta_{III}$ in the profiled portion. In other words the starting angle $\beta$ of the guide vane is increasing—i.e. continuously increasing, e.g. $\beta_I < \beta_{II} < \beta_{III}$—on its way outwards from the hub to the profiled segment. Very much near the hub the guide vane is located on the front or upstream area of the blade. With increasing distance to the hub the guide vane starts more and more in a downstream area of the root segment of the blade.

When seen from a view straight onto a plane created by the chord—or in other words when seen from a direction perpendicular to the chord onto the suction side of the blade—the guide vane or its vane leading edge is embodied as follows: the guide vane in the plain area at least partially covers the upstream area at the leading edge of the blade. When going further along longitudinal direction of the root segment the guide vane leaves a certain part of the upstream area of the blade surface uncovered. That means the guide vane is arranged in such on the surface of the suction side of the blade that i) in the very area near the flange which is mostly round the guide vane is arranged very much upstream and covers the leading edge as well, and ii) subsequently when moving along the blade axis it covers a downstream area of the surface.

One improved embodiment of the invention discloses that the guide vane extends in longitudinal direction at least partly along the surface of the profiled segment of the blade, too. In especially the starting angle $\beta_{IV}$ of the guide vane on the profiled segment of the blade is larger than a starting angle $\beta_{III}$ in the profiled portion of the root segment. This again serves the optimal use of such guide vane not only on the root segment but also on the profiled segment.

Best results for the mentioned embodiment are obtained when the starting angle $\beta_I$ of the plain portion is larger than 5° degree, preferably larger than 10° degree, most preferably larger than 15° degree.

It shows favorable effects if the starting angle $\beta_{II}$ in the transition portion is larger than 20° degree, preferably larger than 25° degree, most preferably larger than 35° degree. For the starting angle $\beta_{III}$ of the profiled portion it is recommended to be larger than 40° degree, preferably larger than 45° degree, most preferably larger than 55° degree. The starting angle $\beta_{IV}$ in the profiled segment is larger than 50° degree, preferably larger than 60° degree, most preferably larger than 90° degree. Those starting angles $\beta_I$, $\beta_{II}$, $\beta_{III}$ can be implemented independently from each other and do stand for themselves as long as those continuously increase or at least partially stagnate.

When seen from a view straight onto a plane created by the chord—or in other words when seen from a direction perpendicular to the chord onto the suction side of the blade—the guide vane or its vane leading edge starts with a little distance from the leading edge of the blade and extends towards the trailing edge of the blade. Thus the guide vane covers a central area of the surface of the suction side of the blade. I.e. the guide vane leaves at least 15%, preferably at least 10%, most preferably at least 5% of the surface of the blade next to the leading edge uncovered. While going downstream the guide vane covers at least another 50%, preferably 70%, most preferably 80% of the remaining surface of the blade. Going further downstream towards the trailing edge the guide vane leaves the remaining surface again uncovered. One embodiment of this independent aspect of the invention comprises that the guide vane covers the remaining part of the surface of the blade.

Another embodiment discloses to choose the starting angles as follows—having in mind that those angles are independent from each other and can be applied independently: A starting angle $\beta_I$ of the plain portion is larger than 30° degree, preferably larger than 40° degree, most preferably larger than 500 degree. A starting angle $\beta_{II}$ in the transition portion is larger than 50° degree, preferably larger than 60° degree, most preferably larger than 70° degree. The starting angle $\beta_{III}$ of the profiled portion is larger than 70° degree, preferably larger than 80° degree, most preferably larger than 90° degree. If available, the starting angle $\beta_{IV}$ in the profiled segment is larger than 90° degree, preferably larger than 110° degree, most preferably larger than 120° degree. The choice of angles is to be made in accordance to the profile type of the blade or root segment and/or the wind conditions of the location where the wind turbine with the inventive blade shall be erected.

In order to be combined with some aspects or entirely with the preceding embodiments, an ending angle $\gamma$ is defined for describing the locations of the guide vane in downstream direction of the blade, i.e. where it ends. The ending angle $\gamma$ is formed by a line between the vane trailing edge and the longitudinal axis of the blade and by the chord and is the ending angle $\gamma$ which is smaller than 20° degree, preferably smaller than 10° degree, more preferably smaller than 5° degree.

In this way the guide vane is effective to guide the airflow and prevent flow separation.

Further embodiments show different specific aspects of the ending angle $\gamma$ which can be combined in an advantageous way: i) an ending angle $\gamma_{III}$ in the profiled portion is equal or smaller than the ending angle $\gamma_I$ in the plain portion. Ii) an ending angle $\gamma_{IV}$ in the profiled section is equal or smaller than the ending angle $\gamma_{III}$ in the plain portion. Iii) an ending angle $\gamma_{II}$ in the transition section is equal or smaller than the ending angle $\gamma_I$ in the plain portion and equal or larger than the ending angle $\gamma_{III}$ in the profiled portion. This further increases the guide vane's effectiveness in ensuring that the airflow follows the contour of the blade.

When the blade has a leading edge and a distance between the leading edge of the blade and the guide vane increases in longitudinal direction from the root outwards, a similar effect to blade twist is achieved.

For improved aerodynamic performance of the blade the vane trailing edge may be located substantially in the same plane perpendicular to the airflow direction as the trailing edge of the blade at least near the inboard and outboard ends of the guide vane.

One independent aspect of the invention discloses the use of a guide vane on the root segment of the blade having a vane leading edge and a vane trailing edge, arranged in such that the guide vane is substantially placed over the blade surface and extends in longitudinal direction at least partly along the surface of the root segment. An imaginary line between the vane leading edge and the longitudinal axis of the blade and the chord forms a starting angle $\beta$ wherein the starting angle β at every location of the vane leading edge is larger than 15° degree, preferably larger than 20° degree, most preferably larger than 30° degree.

Additionally to this—also to be combined with the other embodiments—a line between the vane trailing edge and the longitudinal axis of the blade and the chord form an ending angle γ which is smaller than 20° degree, preferably smaller than 10° degree, more preferably smaller than 5° degree.

When seen from a view straight onto a plane created by the chord—or in other words when seen from a direction perpendicular to the chord onto the suction side of the blade—the guide vane or its vane leading edge starts with a little distance from the leading edge of the blade and extends towards the trailing edge of the blade. Thus the guide vane covers a central area of the surface of the suction side of the blade, i.e. the guide vane leaves 15%, preferably 10%, most preferably 5% of the surface of the blade adjoining to the leading edge uncovered while going downstream the guide vane covers at least another 50%, preferably 70%, most preferably 80% of the remaining surface of the blade. Going further downstream towards the trailing edge the guide vane leaves the remaining surface again uncovered. One embodiment of this independent aspect of the invention comprises that the guide vane covers the remaining part of the surface of the blade.

In order to ensure a smooth transition between the parts of the blade with and without the guide vane, an outboard end of the guide vane may slope towards and meet an adjacent surface of the blade.

The guide vane may be connected to the blade by at least two fences extending substantially in a chordwise direction as to prevent the generation of a crossflow in longitudinal direction.

One specific embodiment teaches in an upstream area near the vane leading edge to place the fences substantially in a chordwise direction and additionally in a downstream area near the vane trailing edge in a chordwise direction and longitudinal direction. Hence the fences also direct the airflow between the surface of the blade and the guide vane in longitudinal direction. This increases the aerodynamic performance of the guide vane.

In one embodiment the blade is provided with a plurality of fences connecting the guide vane to the blade, the fences extending substantially parallel to each other and spaced apart in longitudinal direction. In this way a plurality of side-by-side ducts are formed for directing the airflow over the blade.

For optimum effect each fence may extend in a chordwise direction over substantially the entire local chord of the guide vane.

When the guide vane and fences are connected to the blade such as to form load bearing structural members, the highly loaded root segment of the blade is reinforced by the presence of the guide vane. Together, the guide vane and fences may form a box-like load bearing structure.

The guide vane and/or fences may be integrally formed with the blade. This ensures optimum strength and rigidity while minimizing the manufacturing effort.

In another embodiment the guide vane extends to no more than 40% of the span of the blade measured from the root towards the tip, preferably to no more than 30% and more preferably to a transition between the root segment and the profiled segment. In this way the guide vane is used only in the region where its advantages outweigh the additional drag and structural complexity.

In one embodiment the trailing edge of the guide vane is closer to an adjacent surface of the blade than the leading edge of the guide vane. This leads to converging ducts being formed between the guide vane and the blade, which are advantageous in preventing premature flow separation and generating a better lift-to-drag ratio L/D.

The invention also relates to a wind turbine generator comprising a tower, a hub rotatably mounted at or near a top of the tower, and at least one blade of the type described above mounted on the hub.

Figure 4:
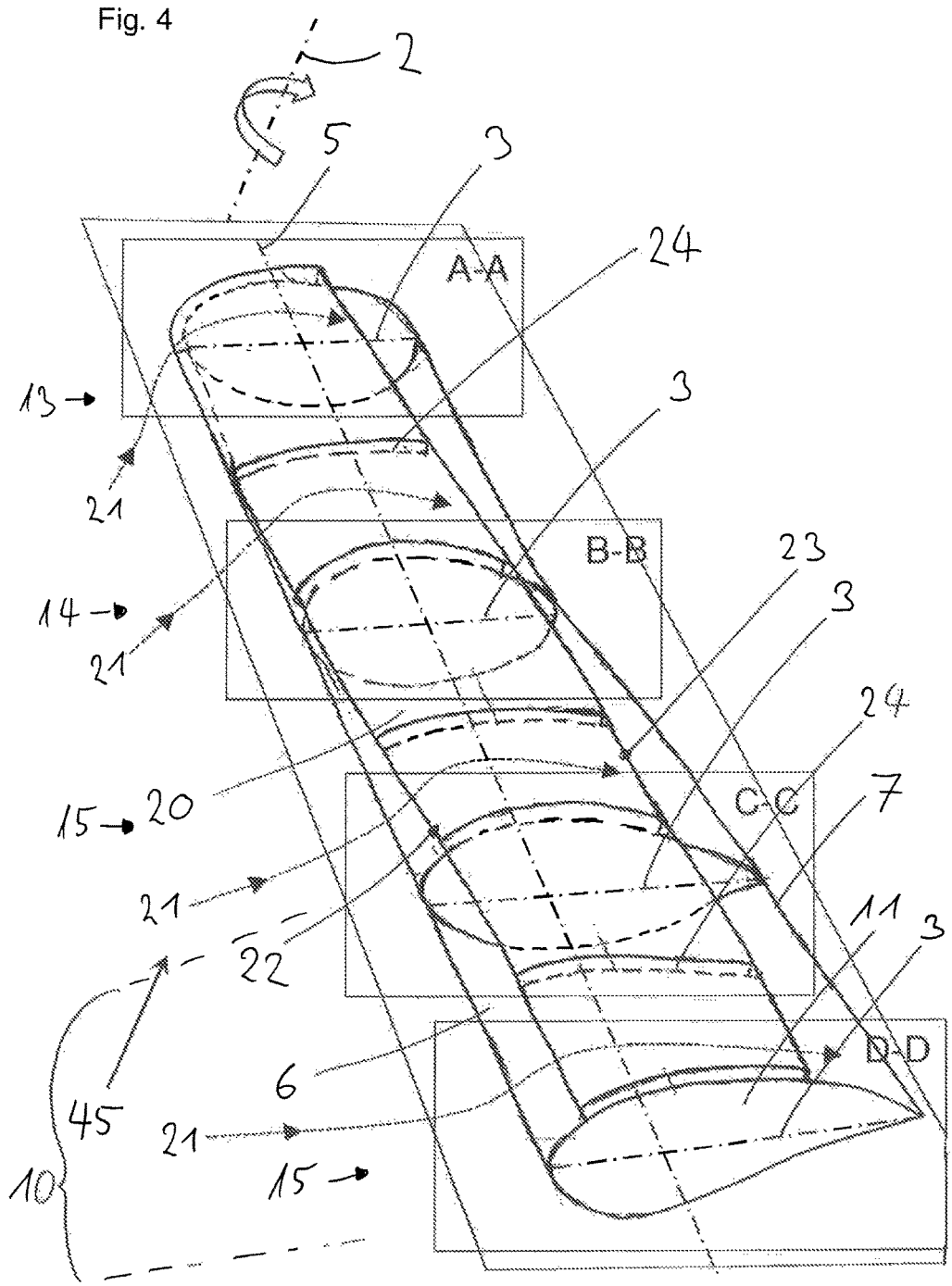
Figure 7:
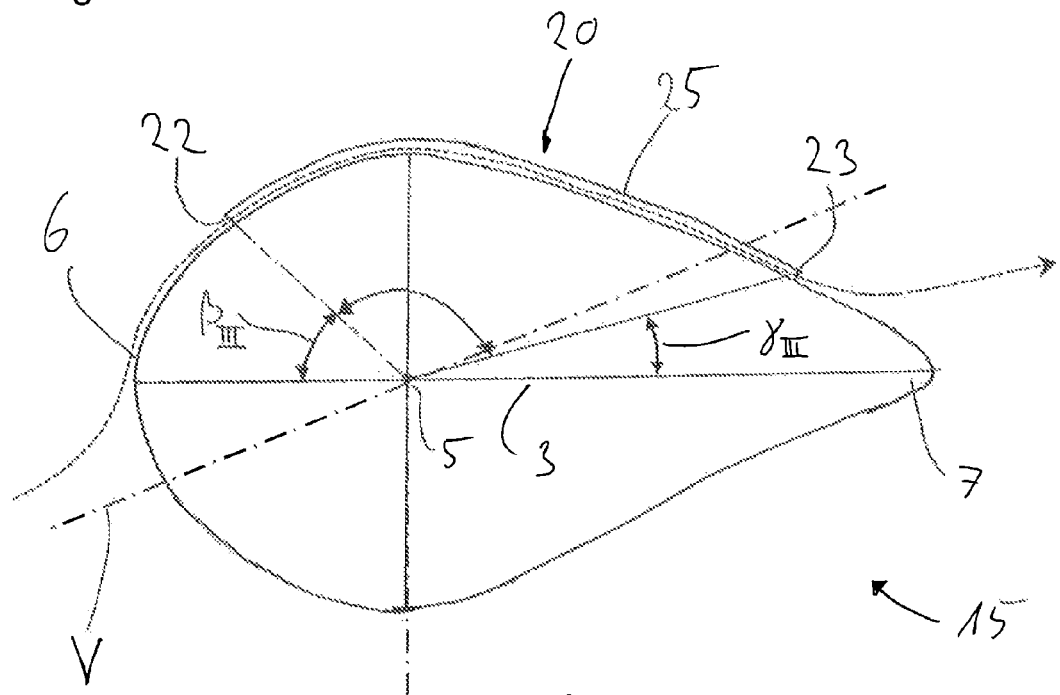
Figure 8:
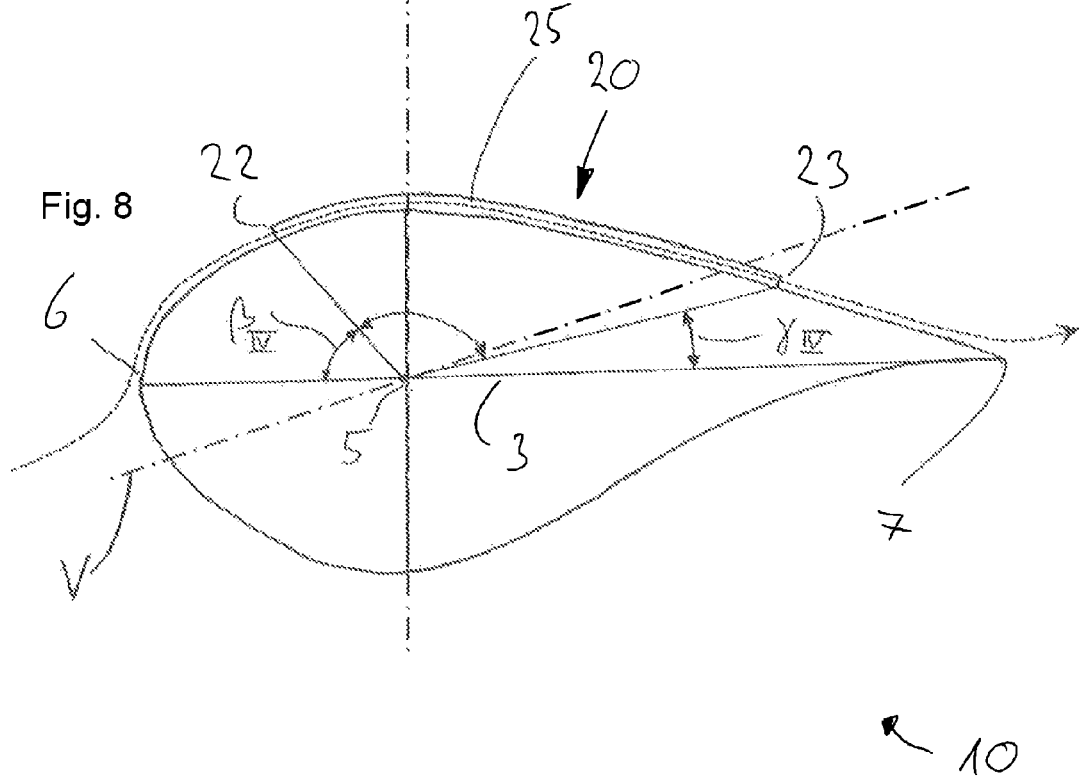
Figure 9:
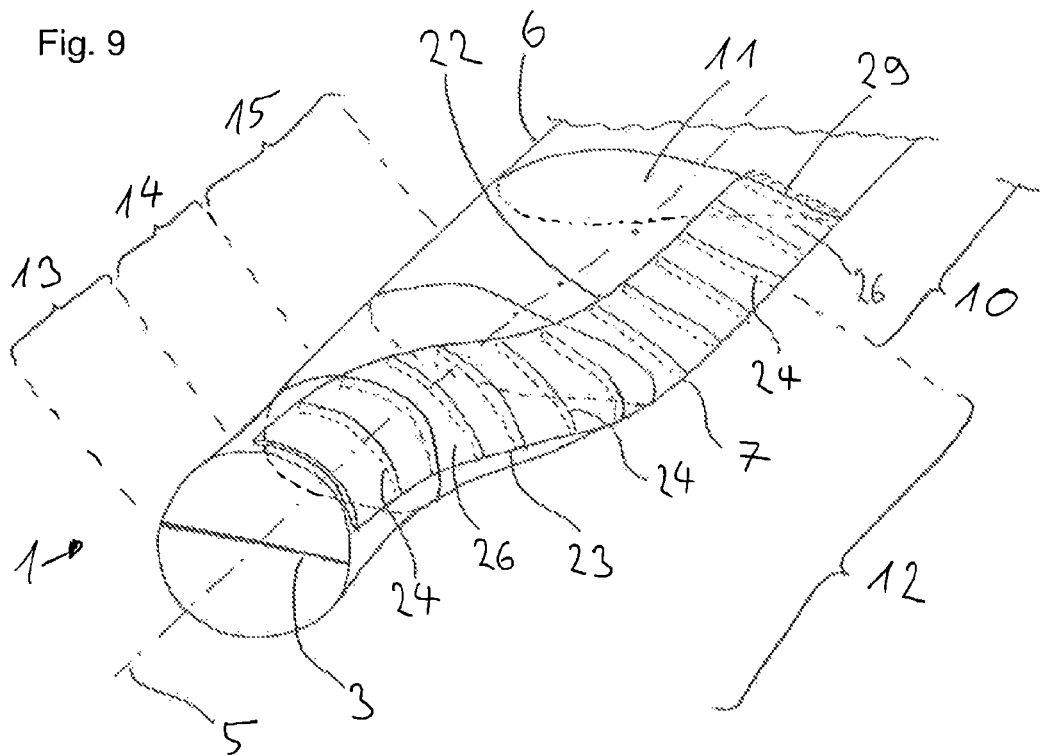
Figure 10:
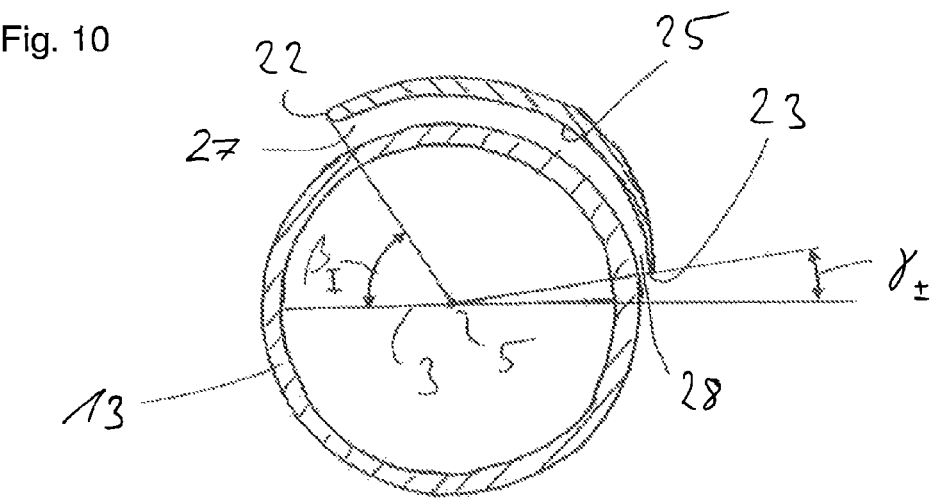

The invention is now elucidated by way of an exemplary embodiment, with reference being made to the accompanying drawing, in which corresponding elements have the same reference numerals, and in which:

FIG. 1 is a perspective view of a wind turbine in which the blade of the invention can be used, FIG. 2 is a perspective view of a wind turbine blade, showing the root segment and profiled segment, FIGS. 3A-3C are schematic representations of the local angle of attack and incidence vector at the positions A, B and C indicated in FIG. 2, FIG. 4 is a perspective view on one embodiment of a root section and profiled section of a blade of a wind turbine having a guide vane, FIG. 5 is a section I of the plain portion of the root section according to FIG. 4, FIG. 6 shows a section II of the transition portion of the root section according to FIG. 4, FIG. 7 shows a section III of the profiled portion of the root section according to FIG. 4, FIG. 8 shows a section IV of the profiled section according to FIG. 4, FIG. 9 is a perspective view in a second embodiment of a blade, FIG. 10 is a section through the plain portion X of the root segment of the blade pursuant to FIG. 9

Figure 11:
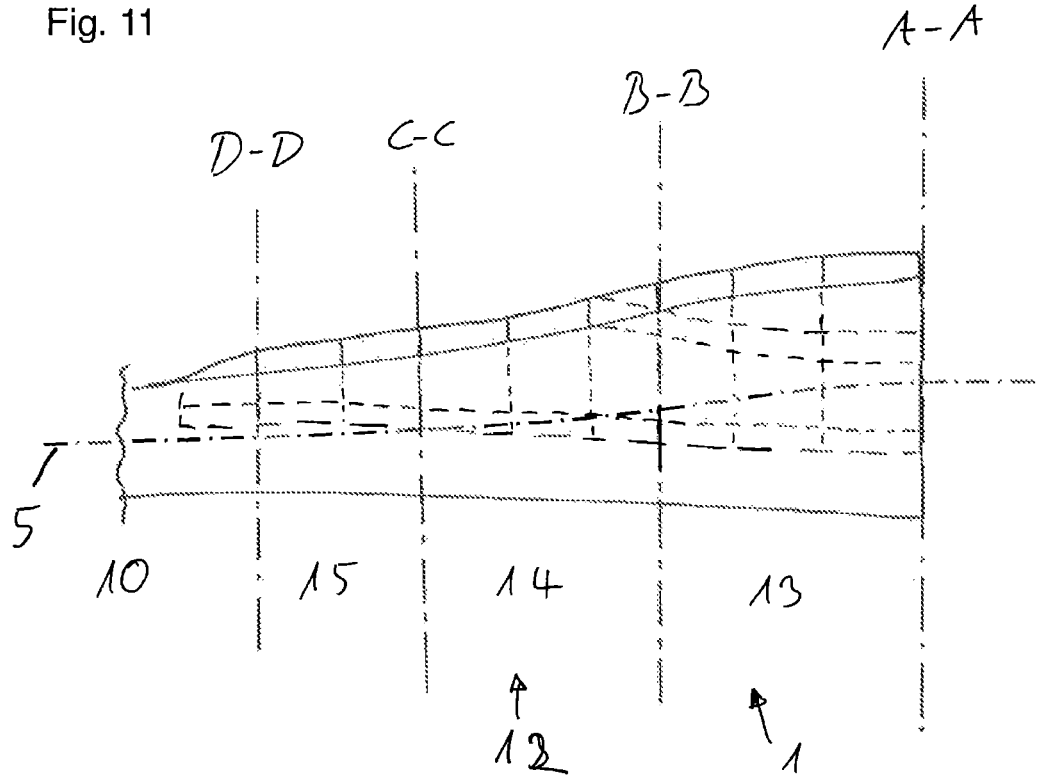
Figure 12:
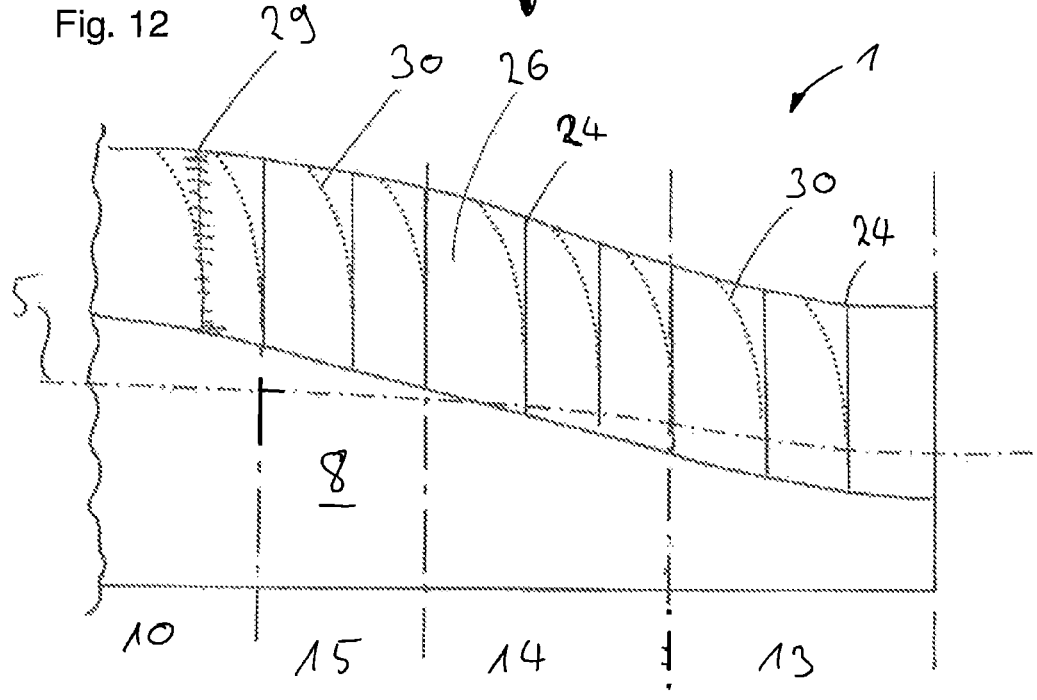

FIG. 11 is a front view of the blade of FIG. 9 when considered in the direction of the airflow, and FIG. 12 is a top view of the blade of FIG. 9.

A wind turbine 40 comprises a tower 41 supporting a nacelle 42 in which an electrical generator (not shown) is housed. The actual wind turbine 40, which comprises a hub 43 and three blades 1, is mounted in bearings in the nacelle 43 so as to be rotatable about a horizontal axis 2. The wind turbine 1 is connected to the generator either directly or through a transmission. The nacelle 43 including the rotor 44 of the wind turbine 1 can rotate on the tower 41 about a vertical axis in order to place the rotor 44 perpendicular to the current wind direction $V_W$.

Each blade 1 of the wind turbine 40 includes a root segment 12 which is connected to the hub 43 and a profiled segment 10 which extends in longitudinal direction 5 from the root segment 6 towards a blade tip 8. The root segment 6 has a substantially circular cross section A-A at the point where it is attached to the hub 43. At some distance from this attachment point the cross section starts to gradually transition towards an aerodynamic, qualified profile 11 of the profiled segment 10. In the transition portion 14 of the root section 12 the cross section of the blade 1 has various distinctive shapes, ranging from a shape somewhere between a circle A-A and an ellipse B-B to a relatively thick and blunt airfoil C-C.

If the angle of incidence of the blade 1 would be constant over its entire span ("untwisted blade"), the local angle of attack α of the airflow around the blade 1 would vary when the blade 1 rotates. This is due to the fact that the local wind speed V of the airflow is the vector sum of the wind speed $V_W$ and the local circumferential speed $V_R$ of the rotating blade 1. This latter local wind speed V is a linear function of the distance of a section from the rotational axis A. In order to keep the local angle of attack α within practical limits, the blade 1 is twisted from the tip 9 inwards towards the root segment 12. By "twisted" it is meant that the local incidence, the geometric angle between a local chord 3 and the plane in which the blade 1 rotates, varies in longitudinal direction 5 of the blade 1.

However, the available amount of twist is limited by the fact that a sufficient clearance must be maintained between the blade 1 and the tower 41. Moreover, excessive twist leads to problems in manufacturing the highly curved load carrying elements.

Therefore, since the blade 1 cannot be sufficiently twisted near the hub 43, the flow characteristics around this root segment 12 of the blade 1 will be unfavorable. The local angle of attack α will be so high that flow separation may occur. Such flow separation will lead to an increase in drag and therefore a reduction in the efficiency of the wind turbine 1.

Moreover, for structural reasons the most highly loaded part of the root segment 12 has a circular cross section A-A. By definition, the airflow around such a circular profile is symmetric under all circumstances. Therefore, this cylindrical part of the root segment 12 does not generate any lift at all, but its profile does generate drag. As a result the root segment 12 of the blade 1 does not contribute in any significant extent to the generation of wind power ("yield"), but it does contribute to the overall drag of the blade 1 ("loss"), thereby reducing the aerodynamic efficiency of the blade 1.

In accordance with the invention FIG. 4 to FIG. 8 the blade 1 is provided with a guide vane 20 which extends in longitudinal direction 5 along the root segment 12. This guide vane 20 runs substantially parallel to the blade 1. In the illustrated embodiment the guide vane 20 extends all the way from the connecting point with the hub 43 in the root section 12 to the profiled section 10 having a first aerodynamic, qualified profile 11. The root section 12 adjoining the profiled section 10 comprises a plain portion 13 with a flange (not shown) for connecting the blade 1 to a hub 43 of the wind turbine 40, a transition portion 14 adjoining the plain portion 13 and neighboring a profiled portion 15 which connects the root section 12 to the profiled section 10.

FIG. 5 is a section A-A through the plain portion 13 of the root segment 12. The dotted line represents the air flow 21 during normal working conditions of the wind turbine 40 when producing electrical energy. The vane leading edge 22 of the guide vane 20 forms a starting angle $\beta_I$ of 5° degree with the chord 3 of the plain portion 13. Since during operation the air flow 21 is very much inclined towards the chord 3 the starting angle $\beta_I$ shall be choses rather small.

The ending angle $\gamma_I$—defined by the vane trailing edge 23 and the chord 3—is about 55° degree.

In the root section 12 the so-called transition portion 14 is arranged next to the plain portion 13 (FIG. 6). This portion marks the area where the initial plain—and preferably round—portion 13 of the blade 1 transforms towards the profiled section 10 of the blade 1 via the so-called profiled portion 15 of the root section 12. This definition shall only represent the fact that the blade 1 has an aerodynamic optimized section 10 mainly contributing to the generation of lift and a root section 12 in which the properly profiled shape of the blade 1 gets transformed in order to be mountable to the hub 43, i.e. onto round bearings which connect the blades 1 to the hub 43. The entire root section 12 is characterized by not having a proper aerodynamic profile—in contrast to the profiled section 10—thus at least partially not comprising a clearly defined chord. Motivated by this the chord 3 for the root section 12 is defined as being parallel to the chord 3 of the first qualified aerodynamic profile 11 in the profiled section 10.

One section B-B through the transition portion 14 is shown in FIG. 6. Due the fact that this portion has a larger radius with regards to the rotational axis 2 of the rotor 44 of the wind turbine 1 the air flow 21 is not as much inclined with regards to the chord 3 as in the plain portion 13 the starting angle $\beta_{II}$ in the transition portion 14 larger than the starting angle $\beta_I$ of the plain portion 13. I.e. the starting angle $\beta_{II}$ is about 25° to 30° degree having in mind that this starting angle β shall increase constantly with the distance to the rotational axis 2.

According to this embodiment an ending angle $\gamma_{II}$ is about 25° degree so the airflow out of the guide vane 20 leaves the guide vane 20 below the level of the local direction of the air flow 21. Alternatively the ending angle $\gamma_{II}$ may be chosen larger thus the airflow out of the guide vane 20 leaves the guide vane 20 above the local direction of the air flow 21.

The profiled portion 10 of the root section 12 displayed by a section C-C in FIG. 4 (FIG. 7) already produces a veritable amount of lift but it is not yet elaborated as qualified aerodynamic profile as the shape of the blade 1 in the profiled section 10 as shown in FIG. 8 (section D-D in FIG. 4). Pursuant to the present embodiment the starting angle $\beta_{III}$ of the profiled portion 15 is about 40° to 45° degree and the starting angle $\beta_{IV}$ of the profiled section around °50° degree.

Both profiles are similar hence the ending angle $\gamma_{III}$ of the profiled portion 15 is very similar—but little smaller—than the ending angle $\gamma_{IV}$ of the profiled section 10. In both cases the airflow 21 out of the guide vane 20 leaves the guide vane 20 below the local direction of the air flow 21. Alternatively the ending angles $\gamma_{IV}$ may be chosen larger.

FIG. 9 to FIG. 12 are presenting another embodiment of the inventive blade 1. The guide vane 20 is mounted on the blade 1 by means of a plurality of mutually parallel fences 24. Each fence 24 extends substantially from a leading edge 22 of the guide vane 20 to a trailing edge 23 thereof, thus covering the entire local chord of the guide vane 20. The fences 24, the surface 8 of the blade 1 and an inwardly directed surface 25 of the guide vane 20 together define a series of parallel ducts 26.

Moreover, the presence of the guide vane 20 maintains the airflow 21 attached to the surface 13 of the blade 1, thus preventing flow separation. By thus increasing lift and reducing drag, the guide vane 20 allows the root segment 12 to contribute to the yield of the wind turbine 1, rather than merely causing efficiency losses.

An additional benefit is that the longitudinal lift distribution becomes more uniform in this way. Without the guide vane the pressures on both surfaces of the root segment 12 are substantially equal, while there is a substantial difference in pressures between the two sides of the profiled segment 10 of the blade 1. This leads to a substantial, almost stepwise change in pressure between the profiled segment 10 and the root segment 12, which in return causes substantial cross flows.

The position of the guide vane 20 relative to the blade 1 may vary in longitudinal direction 5. In this way the airflow around each section of the blade 1 may be influenced in a specific manner so as to optimize the airflow 21 at each spanwise location. In the illustrated embodiment the guide vane 20 more or less follows the contour of the trailing edge 7 of the blade 1. Consequently, the distance between the vane leading edge 16 of the guide vane 20 and the leading edge 6 of the blade 1 increases from the connection with the hub 43 towards the profiled section 10. In this way the same effect may be achieved that would result from further twisting the root segment, without the attendant drawbacks in terms of loss of structural and aerodynamic efficiency and tower clearance.

The optimum location of the guide vane 20 on the blade 1, both in chordwise direction 3 and in longitudinal direction 4, can be determined by experiments and/or by computer simulation. In the shown embodiment the vane leading edge 22 is located near 40 percent of the chord (seen from the leading edge 6), while the vane trailing edge 23—when considered in plan view—substantially coincides with the trailing edge 7 of the blade 1.

The outboard end 29 slopes towards the blade 1 and eventually meets the surface 8 of the blade 1 to provide a smooth transition.

One embodiment discloses that the cross-sectional area 28 of the ducts 26 at the vane trailing edge 23 at downstream side of the guide vane 20 is smaller than the cross-section 27 at the upstream side, thus resulting in a convergent shape. This convergence, which is achieved by placing the guide vane trailing edge 23 closer to the surface 8 of the blade 1 than its vane leading edge 22, results in an acceleration of the airflow 21 in the duct 26. This acceleration and the associated pressure reduction lead to the generation of lift, even by the cylindrical root segment 12.

In FIG. 12 a further independent embodiment of the vane guides 20 is presented by the dotted line 30 representing the fences 24 extend in an upstream area near the vane leading edge 22 substantially in a chordwise direction 4 and in a downstream area near the vane trailing edge 23 in a chordwise direction 4 and longitudinal direction 5. This is favorable for enabling a certain amount of cross flow.

The addition the guide vane 20 is not just advantageous from an aerodynamic point of view, but may also be used to good effect to relieve the highly loaded root segment 12. When the guide vane 20 and the fences 24 are formed as load bearing members, they may contribute to the overall strength and rigidity of the root segment 12, thus reducing local stresses. The guide vane "box" formed by the guide vane 20 and fences 24 may be very effective in this respect, since the guide vane 20 is further removed from the center of the blade 1 than the blade skin, which normally carries the loads. Therefore the guide vane 20 can contribute more to the bending stiffness and torsional stiffness of the root segment 12 than the skin does.

Consequently, the wall thickness of the root segment 12 may be reduced, leading to a weight reduction which may at least partially offset the additional weight of the guide vane 20 and fences 24. For maximum structural efficiency the guide vane 20 and/or the fences 24 may be integrally formed with the blade 1, which will typically be made of a fiber reinforced composite material like GFRP or CFRP.

Although the invention has been illustrated here by way of an exemplary embodiment, it will be clear to the skilled person that many modifications and variations are possible. For instance, the plan view and profile of the guide vane may be varied, as may be the number of fences. Some of the fences might be replaced by other attachment means, like struts. The distance between the guide vane and the blade may also be varied, and the blade may have more than one guide vane 20. Consequently, the scope of the invention is defined solely by the following claims.

Different single aspects of the embodiments shown above may be combined in an advantageous way, e.g. the mentioned chordwise and longitudinal arranged fences are also applicable in the embodiment according to FIG. 4 to FIG. 8.

| Reference list | |
|---|---|
| 1 | blade |
| 2 | horizontal axis |
| 3 | chord |
| 4 | chordwise direction |
| 5 | longitudinal direction/axis |
| 6 | leading edge |
| 7 | trailing edge |
| 8 | blade surface |
| 9 | blade tip |
| 10 | profiled segment |
| 11 | aerodynamic, qualified profile |
| 12 | root segment |
| 13 | plain portion |
| 14 | transition portion |
| 15 | profiled portion |
| 16 | suction side |
| 20 | guide vane |
| 21 | air flow |
| 22 | vane leading edge |
| 23 | vane trailing edge |
| 24 | fence |
| 25 | inwardly directed surface |
| 26 | duct |
| 27 | cross-sectional area |
| 28 | cross-sectional area |
| 29 | outboard end |
| 30 | dotted line |
| 40 | wind turbine |
| 41 | tower |
| 42 | nacelle |
| 43 | hub |
| 44 | rotor |
| $\alpha$ | angle of attack |
| $\beta$ | starting angle |
| $\gamma$ | ending angle |
| V | local wind speed |
| $V_W$ | wind speed |
| $V_R$ | circumferential speed |

The invention claimed is:

1. A blade for a wind turbine, the blade comprising a longitudinal axis, a root segment with a flange for connecting the blade to a hub of a rotor of the wind turbine, and a profiled segment extending in a longitudinal direction from the root segment towards a tip of the blade, wherein the profiled segment has a lift producing profile and a chord that is perpendicular to the longitudinal axis and substantially extends from a leading edge to a trailing edge of the profile, wherein the root segment has a profiled portion adjoining the profiled segment, a plain portion adjoining the flange, and a transition portion located between the profiled portion and the plain portion, wherein the profiled portion has a substantially profiled cross-section, the plain portion has a substantially rounded cross-section, and portions of the root segment have chords that are parallel to each other and substantially parallel to the chord of a portion of the profiled segment adjoining the profiled portion of the root segment, wherein at least one guide vane has a vane leading edge and a vane trailing edge, arranged such that the guide vane is substantially placed over a blade surface of a suction side of the blade and extends in the longitudinal direction at least partly along the surface of the root segment, wherein a line between the vane leading edge, the longitudinal axis of the blade and the chord form at least one starting angle, and further wherein a second starting angle in the transition portion is greater than a first starting angle in the plain portion and less than a third starting angle in the profiled portion.

2. The blade according to claim 1, wherein the guide vane extends in the longitudinal direction at least partly along the surface of the profiled segment of the blade, and a fourth starting angle in the profiled segment is greater than the third starting angle in the profiled portion of the root segment.

3. The blade according to claim 1, wherein the vane trailing edge at least partially follows a contour of the trailing edge of the blade.

4. The blade according to claim 1, wherein the guide vane is connected to the blade by at least two fences extending partially in a chordwise direction.

5. The blade according to claim 4, wherein the at least two fences extend in an upstream area near the vane leading edge substantially in a chordwise direction and in a downstream area near the vane trailing edge in a chordwise direction and the longitudinal direction.

6. The blade according to claim 4, wherein a plurality of fences connect the guide vane to the blade, the plurality of fences extending substantially parallel to each other and spaced apart in the longitudinal direction.

7. The blade according to claim 4, wherein the guide vane and fences are integrally formed with the blade.

8. The blade according to claim 1, wherein the guide vane extends to no more than 40% of the length of the blade.

9. The blade according to claim 1, wherein the vane trailing edge is closer to an adjacent surface of the blade than the vane leading edge.

10. A wind turbine comprising a tower, a hub ratably mounted at or near a top of the tower, and at least one of the blades, according to claim 1, mounted on the hub.

11. The blade according to claim 8, wherein the guide vane extends to no more than 30% of the length of the blade.

\* \* \* \* \*

UNITED STATES PATENT AND TRADEMARK OFFICE
CERTIFICATE OF CORRECTION

PATENT NO. : 9,670,902 B2
APPLICATION NO. : 14/360185
DATED : June 6, 2017
INVENTOR(S) : Philipsen Page 1 of 1

It is certified that error appears in the above-identified patent and that said Letters Patent is hereby corrected as shown below:

In the Claims

Column 4, Line 17, "500" should read -- 50° --.

Column 6, Line 55, "11" should read -- 12 --.

Signed and Sealed this
Twenty-sixth Day of November, 2019

Andrei Iancu
*Director of the United States Patent and Trademark Office*